Figure 1:
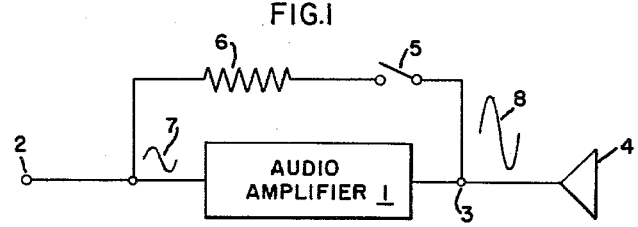

July 20, 1965  Y. M. HOAG  3,196,357
BATTERY CONDITION TESTER FOR DEVICES HAVING AN AUDIO
AMPLIFIER AND ELECTRO-ACOUSTIC TRANSDUCER
Filed Dec. 31, 1962

INVENTOR:
YATES M. HOAG,

BY Norman C. Fulmer

HIS ATTORNEY.

United States Patent Office 3,196,357
Patented July 20, 1965

3,196,357
BATTERY CONDITION TESTER FOR DEVICES HAVING AN AUDIO AMPLIFIER AND ELECTRO-ACOUSTIC TRANSDUCER
Yates M. Hoag, Utica, N.Y., assignor to General Electric Company, a corporation of New York
Filed Dec. 31, 1962, Ser. No. 248,748
3 Claims. (Cl. 325—492)

My invention relates to a battery condition tester for use with battery-powered electronic equipment.

It is frequently essential or highly desirable to provide means for ascertaining the condition of the battery in battery-powered electronic equipment. More specifically, it is desirable that the operator of such equipment be given an indication that the usable battery life is approaching an end, prior to actual termination of normal operation. The problem is particularly pronounced in electronic devices such as transistorized radio receivers, wherein battery voltage drops progressively with use but little degradation of performance is normally experienced up to the time when battery voltage drops to a determinable critical voltage, below which circuit operation abruptly terminates. Sudden termination of performance is singularly vexing when it is desired to use the device away from usual sources of power and replacement batteries such as, for example, at picnics, baseball games or aboard boats. In a radio receiver, the sudden cessation of normal operation is usually caused by a failure of the local oscillator to perform its assigned function. In a typical radio design, the critical battery voltage is equal to one-half the voltage of new batteries. In such equipment, it is desirable that the user have some means at his disposal for anticipating the critical one-half voltage condition.

Since the ordinary user is unable to evaluate battery condition by technical observations, such as by circuit performance, the battery condition indicator should be simple to operate and positive in its response. Also, it is essential that the battery condition indicator be economical to manufacture, as well as that it consume a minimum amount of current from the battery, and then, only when activated to provide an indication. It is apparent that the latter considerations are not fully met by the use of such testing apparatus as meters or neon indicators, and require that as far as possible the battery condition tester utilize existing circuitry within the particular electronic device. Preferably, such common circuitry should not include sensitive radio frequency circuits, to avoid disturbing the balanced electrical relationships within the device.

An object of my invention is to provide an economical battery condition tester for a battery-powered electronic device.

Another object of my invention is to provide a battery condition tester, for a battery-powered electronic device, which provides a positive indication of the condition of the battery.

Still another object of my invention is to provide a battery condition tester, for use with a battery-powered electronic device, which does not consume battery power except when selectively actuated by the user to provide an indication of battery condition.

These objects and others, which will be apparent as the nature of the invention is disclosed, are accomplished in accordance with one form of the present invention, pertaining to a transistorized radio circuit, by providing a regenerative feedback circuit in the audio amplifier stage of the receiver. The impedance of the feedback path is adjusted during manufacture to provide audio oscillation in the amplifier stage only for battery voltages above a predetermined magnitude. Thereafter, the user may test for battery condition by merely closing a switch, which completes the feedback path, and noting the presence or absence of audio oscillations, as converted to sound by the receiver speaker. The presence of a note issuing from the speaker provides an indication that the battery voltage is above the predetermined magnitude and the batteries may be relied upon for further service. Conversely, if the user does not detect a note, the batteries should be replaced.

Figure 2:
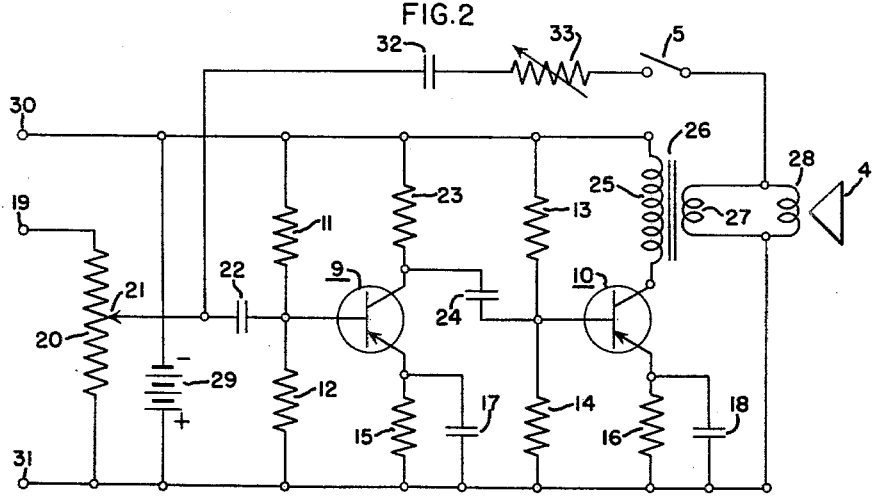

Although the novel features which are believed to be characteristic of this invention will be pointed out with particularity in the claims appended hereto, the invention itself, its objects and advantages, the manner of its organization and the mode of its operation will be better understood by referring to the following description taken in connection with the accompanying drawing, forming a part thereof, in which:

FIG. 1 shows a block diagram of an audio amplifier together with a schematic representation of the feedback network of my invention, and FIG. 2 is a schematic representation of my invention in combination with a specific audio amplifier circuit.

Turning to FIG. 1, there is shown therein an audio amplifier 1 having an input terminal 2 and an output terminal 3 which provides a signal of sufficient power to drive electro-acoustic transducer 4, which may take the form of an ordinary loud-speaker. A switch 5, having normally open contacts, and an impedance 6 are serially connected between output terminal 3 and input terminal 2. From input waveform 7 and output waveform 8, it will be noted that switch 5 and feedback impedance 6 are connected between points carrying in-phase voltages. It is, therefore, apparent, neglecting any small phase shift in impedance 6, that the feedback signal will be in phase with the input signal to amplifier 1. As is well known in the art, such feedback is denominated "positive" or regenerative feedback, and will tend to introduce oscillations in audio amplifier 1 when switch 5 is closed. The tendency to oscillate is dependent upon the size of impedance 6 and the gain of audio amplifier 1.

The tendency toward oscillation, of the arrangement of FIG. 1, will increase inversely with the magnitude of impedance 6 and directly with the gain of audio amplifier 1. For transistorized equipment, the gain of audio amplifier 1 is dependent to some degree upon a variety of parameters, including temperature, transistor types, specific transistors used within a given type, and supply voltage. By conservative design, and through the use of compensating device, such as temperature-sensitive resistors, the dependence upon these parameters is minimized. However, a large variation of the parameters is attended by some change in gain. In particular, a reduction of supply voltage to about 60% of the voltage for which the circuit is designed, may produce a reduction in audio amplifier gain, as well as an increase in distortion, although the latter is not readily apparent to the listener.

Assuming that audio amplifier 1 is conservatively designed, and is provided with adequate temperature compensation, the variation in gain of any given amplifier depends primarily upon supply voltage. This is particularly so when the supply voltage has decreased substantially below the design supply voltage, for example, to 60% of the design voltage. Therefore, if the supply voltage of audio amplifier 1 be reduced to about 60% of the design value and the magnitude of impedance 6 be then selected, with switch 5 closed, as a value which just sustains audible oscillations, as heard in speaker 4, then no audible oscillations will occur when the supply voltage is below this value. Further, the intensity of oscillations produced increases for supply voltages above this value. Hence, after so selecting the magnitude of impedance 6, a mere closing of switch 5 furnishes an audible indication of whether the supply voltage is above or below that value for which oscillations were barely sustained.

Impedance 6 may take the form of a variable resistance inserted as a part of audio amplifier 1 during the manufacture thereof, and switch 5 can be located such as to be operable externally, for example, by means of a push-button. Impedance 6 is then adjusted during the final manufacturing steps barely to sustain oscillations in audio amplifier 1 when the equipment is subjected to a predetermined voltage.

A variable resistance is preferred to allow for changes in individual amplifier gain, but if circuit performance is sufficiently constant, a fixed resistor may be used. Thereafter, when a user desires to know the condition of an associated battery power supply, as reflected by the supply voltage, this is accomplished by merely closing switch 5 and noting the absence or presence of an audible signal from speaker 4. It is apparent that the predetermined voltage would normally be selected somewhat above that power supply voltage at which the amplifier, or any circuitry associated therewith and sharing its battery power supply, ceases normal operation. When switch 5 is then closed, an absence of audible signal from speaker 4 provides an indication that the battery should be replaced.

FIG. 2 shows my invention as applied to a specific Class A audio amplifier. It is to be understood that this showing is not intended to be in any way limiting, as my invention is equally applicable to any amplifier, including, for example, push-pull Class B circuits. The amplifier shown includes transistors 9 and 10 having respective pairs of base biasing resistors 11, 12 and 13, 14, each being connected in series across the source of supply voltage 29, the base electrodes of the respective transistors being connected between the resistors of the corresponding pair. Emitter biasing resistances 15 and 16, together with their associated bypass capacitors 17 and 18, are similarly provided for transistors 9 and 10, respectively.

An input signal to be amplified is applied between input terminals 19 and 31, between which resistance 20 is connected. The resistance 20 has a variable tap 21 thereon for volume control purposes. Such an input arrangement is frequently used in the audio section of radio receivers to provide a volume control through a rotatable knob which positions tap 21. Tap 21 is, in turn, connected to the base of transistor 9 through coupling capacitor 22. A phase-reversed and amplified version of the input signal voltage then appears across collector load resistance 23 of transistor 9, and is coupled to the base of transistor 10 through coupling capacitor 24. The amplified output signal from transistor 10 then appears across its associated collector winding 25 of audio frequency output transformer 26. A corresponding voltage is induced in output winding 27 of transformer 26, which is connected to speaker coil 28 of speaker 4.

The operation of amplifier circuits such as that last described and shown in FIG. 2 is considered to be sufficiently well established in the art to render further explanation unnecessary. Battery 29, the condition of which is of primary interest, is connected as shown to supply power to the above-described amplifier, and in addition, supplies power to additional circuitry through terminals 30 and 31.

One side of switch 5 is connected to a terminal, of either winding 27 or winding 28, of such polarity as to provide regenerative feedback, when the switch is closed, through impedance 33 and the coupling capacitor 32. Thus, the output signal is returned to the input of transistor 9 through coupling capacitor 22. Coupling capacitor 32 is provided for direct current isolation which may be required to protect circuitry connected to terminal 19.

It is apparent when tap 21 is adjacent that side of resistance 20 nearest terminal 19, that closing switch 5, in the absence of coupling capacitor 32, provides a direct-current return path to the positive battery terminal through variable impedance 33 and low impedance windings 27 and 28. Since variable impedance 33 is normally of low magnitude itself, the impedance of this entire direct current return path may be sufficiently low to require the coupling capacitor 32 for protection of preceding circuitry supplying terminal 19. Of course, in the event that the preceding circuitry supplying terminal 19 is relatively unaffected by an occasional low impedance ground return path, the capacitor 32 may be omitted from the feedback network.

Turning to the oscillatory performance of the amplifier during testing; the low impedance of windings 27 and 28, together with the relatively low impedance of variable impedance 33, make the position of tap 21 on variable resistance 20 not critical. In practice, it has been found that a wide range of tap settings intermediate the two extremes is attended by no significant degradation of circuit performance.

To operate the battery condition tester of FIG. 2, the user merely switches the equipment "on" and adjusts the tap 21 to an intermediate position. Both functions are usualy performed by a single control knob. Thereafter, switch 5 is closed, preferably by depressing an externally operable push-button. If a sharp note is rendered by speaker 4, the batteries may be considered reliable for further service. If no such note is detected, fresh batteries should be installed as soon as available.

The resulting battery condition tester is economical of manufacture, since it utilizes the existing amplifier stage and speaker of the receiver. The tester consumes no current when not in use and is associated only with the relatively insensitive audio amplifier portion of the receiver. In addition, the response is a note, or beep, when the batteries are in satisfactory condition, giving the user a positive indication which is readily detected.

While I have shown and described the battery condition tester of my invention as applied to a complete audio amplifier, it is to be understood that my invention is equally applicable to feedback networks disposed about a portion of an audio amplifier circuit. The feedback path may originate at the output of any even number of phase-reversing amplifying stages, or at a phase-reversed connection, such as a transformer disposed in the output, of any odd number of phase-reversing amplifying stages.

While I have shown that the battery condition tester network of my invention is particularly well suited for use in transistorized radio receiver circuits, it will be understood that my invention may be used with equal facility to test the battery condition in any electronic device having an audio amplifier stage and an associated electro-acoustic transducer, such as a radio receiver speaker. Also, it may be preferable in some applications to provide an output jack to receive the voice coil leads of an external speaker or the input leads to a radio headset, only during the actual testing of the equipment. Many ways of combining the operation of a switch, such as I have shown as switch 5, with a plug-in jack arrangement are known in the art and may be used without departing from the scope of my invention. Various other modifications and variations of the battery condition tester of my invention will suggest themselves to those skilled in the art, without departing from the scope of my invention as defined by the following claims.

What is claimed as new and desired to be secured by Letters Patent of the United States is:

1. A battery condition tester for use with an electronic device including a battery-powered audio amplifier normally operative for amplifying input signals applied thereto, and an audible signal device responsive to the audio output of said amplifier to produce an audible signal output, said battery condition tester comprising a normally inoperative regenerative feedback circuit for said amplifier whereby the amplifier will amplify said input signals applied thereo, and means to render said feedback circuit operable, when it is desired to test the condition of the battery, to produce regeneration in said audio amplifier thereby to produce an audible signal from said signal device only when the potential of said battery is above a predetermined value higher than the minimum potential of said battery for normal operation of the amplifier.

2. A battery condition tester for use with a battery-powered electronic device having a predetermined minimum threshold battery voltage for normal circuit operation and having an audio amplifier normally operative for amplifying input signals applied thereto, said audio amplifier having a common power supply with said electronic device and having an electro-acoustic transducer responsive thereto, said battery condition tester comprising: impedance means and normally open switch means disposed in series circuit relationship; and means for connecting said impedance means and said switch means in regenerative feedback relationship with said audio amplifier, whereby the amplifier will amplify said input signals applied thereto when said switch means is in the normally open condition, the magnitude of said impedance means being of a value to provide audio oscillation in said audio amplifier only for battery voltages above a predetermined magnitude which exceeds said minimum threshold battery voltage, whereby an audible response from said transducer produced by regeneration of said amplifier in response to closure of said switch means provides an indication of the condition of said power supply.

3. The combination comprising: a battery-powered transistor radio receiver, having an audio amplifier stage and a speaker responsive thereto; and a circuit including a resistance and a normally open switch serially disposed in regenerative feedback relationship in said audio amplifier stage whereby said radio operates normally when said switch is in the normally open condition, the magnitude of said resistance being of a value to provide audible oscillation in said amplifier only for battery voltages in excess of a predetermined value, whereby an audible tone from said speaker in response to closure of said switch provides an indication of the battery condition.

References Cited by the Examiner

UNITED STATES PATENTS 3,063,004   11/62   Vic _____ 324—29.5
3,090,917   5/63    Kuck _____ 325—113

DAVID G. REDINBAUGH, *Primary Examiner.*